(12) United States Patent
Snyder et al.

(10) Patent No.: US 10,953,571 B2
(45) Date of Patent: Mar. 23, 2021

(54) METAL CASTING METHODS IN MICROGRAVITY AND OTHER ENVIRONMENTS

(71) Applicant: Made In Space, Inc., Moffett Field, CA (US)

(72) Inventors: Michael Snyder, Mountain View, CA (US); Matthew Napoli, Sunnyvale, CA (US); Jason Dunn, Mountain View, CA (US); Aaron Kemmer, Mountain View, CA (US)

(73) Assignee: MADE IN SPACE, INC., Moffett Field, CA (US)

( * ) Notice: Subject to any disclaimer, the term of this patent is extended or adjusted under 35 U.S.C. 154(b) by 525 days.

(21) Appl. No.: 14/555,234

(22) Filed: Nov. 26, 2014

(65) Prior Publication Data

US 2015/0144284 A1    May 28, 2015

Related U.S. Application Data

(60) Provisional application No. 61/908,750, filed on Nov. 26, 2013.

(51) Int. Cl.
| | | |
|---|---|---|
| *B29C 33/38* | (2006.01) | |
| *B22D 17/20* | (2006.01) | |
| *B22D 17/22* | (2006.01) | |
| *B22D 17/14* | (2006.01) | |
| *B29C 64/118* | (2017.01) | |
| *B29C 33/40* | (2006.01) | |

(52) U.S. Cl.
CPC ........ *B29C 33/3842* (2013.01); *B22D 17/145* (2013.01); *B22D 17/2015* (2013.01); *B22D 17/2092* (2013.01); *B22D 17/2209* (2013.01); *B29C 64/118* (2017.08); *B29C 33/40* (2013.01)

(58) Field of Classification Search
None
See application file for complete search history.

(56) References Cited

U.S. PATENT DOCUMENTS 3,534,926 A  * 10/1970  Wuenscher .............. B64G 1/12
                                                    117/32
3,583,467 A  *  6/1971  Bennett ............. B22D 17/2218
                                                    164/128
3,620,294 A  * 11/1971  Hetzel .................... B22D 18/06
                                                    164/155.4

(Continued)

OTHER PUBLICATIONS

O'Connell, Frank. "A Machine That Gives Shape to Your ideas." The New York Times, published Sep. 14, 2011, <http://www.nytimes.com/interactive/2011/06/15/technology/personaltech/20110915-BASICS.html?_r=0> (accessed Jun. 10, 2017).*

(Continued)

*Primary Examiner* — Kevin E Yoon
*Assistant Examiner* — Jacky Yuen
(74) *Attorney, Agent, or Firm* — Terry M. Sanks, Esquire; Beusse Sanks, PLLC

(57) ABSTRACT

Apparatus and methods for creating cast metal objects in space and other environments. Molds are created using additive manufacturing and are injected with a castable metal having a melting point lower than a mold melting point. In some aspects, the additive manufacturing device and the metal casting unit are contained in the same unit.

13 Claims, 14 Drawing Sheets

(56) References Cited

U.S. PATENT DOCUMENTS

| | | | | |
|---|---|---|---|---|
| 4,093,019 | A | * | 6/1978 | Seybold ................. B22D 23/06 164/495 |
| 4,614,630 | A | * | 9/1986 | Pluim, Jr. .......... B22D 17/2209 164/113 |
| 4,729,780 | A | * | 3/1988 | Shimizu .............. B22D 13/063 164/114 |
| 5,259,436 | A | * | 11/1993 | Yun ......................... C04B 41/51 164/113 |
| 5,562,150 | A | * | 10/1996 | Shimmell ............ B22D 17/145 164/305 |
| 5,775,402 | A | * | 7/1998 | Sachs ..................... B22C 9/065 164/4.1 |
| 5,939,008 | A | * | 8/1999 | Comb ................... B33Y 10/00 264/308 |
| 6,367,765 | B1 | * | 4/2002 | Wieder .................. B22C 9/067 249/141 |
| 6,431,975 | B1 | * | 8/2002 | Ryan .................... B08B 15/023 141/93 |
| 7,777,155 | B2 | * | 8/2010 | Twelves, Jr. .......... B23P 21/004 219/121.86 |
| 8,342,229 | B1 | * | 1/2013 | Ziani ..................... B22D 17/08 164/113 |
| 10,265,911 | B1 | | 4/2019 | Capri |
| 2003/0230393 | A1 | * | 12/2003 | Kimura .................. B22C 9/061 164/113 |
| 2005/0023710 | A1 | * | 2/2005 | Brodkin ............. A61C 13/0003 264/16 |
| 2005/0173839 | A1 | * | 8/2005 | Crump .................. B33Y 30/00 264/401 |
| 2007/0267165 | A1 | * | 11/2007 | Monteiro ............. B22D 21/005 164/65 |
| 2009/0050289 | A1 | * | 2/2009 | Lismont ................. B22D 17/04 164/457 |
| 2014/0048970 | A1 | | 2/2014 | Batchelder et al. |
| 2014/0050921 | A1 | * | 2/2014 | Lyons ....................... B32B 5/16 428/372 |
| 2015/0096713 | A1 | * | 4/2015 | Marcin ................ B22D 17/229 164/520 |
| 2015/0186757 | A1 | | 7/2015 | Priyadarshi |
| 2016/0023486 | A1 | | 1/2016 | Priyadarshi |
| 2016/0068793 | A1 | | 3/2016 | Maggiore |
| 2017/0072643 | A1 | | 3/2017 | Ng et al. |

OTHER PUBLICATIONS

LeftAngle. "Injection Printing—Injection Molding with your 3D printer." Thingiverse, published May 1, 2013, <https://www.thingiverse.com/thing:82666> (accessed Jun. 10, 2017).*

LeftAngle. "Extreme High Definition Parts on Your 3D Printer." Thingiverse, published May 4, 2013, <https://www.thingiverse.com/thing:83805> (accessed Jun. 10, 2017).*

Gaerisl. "Fume Chamber (Negative-Pressure, Activated Carbon Filtering)." Thingiverse, published Nov. 23, 2011, <https://www.thingiverse.com/thing:13851> (accessed Jun. 10, 2017).*

Autom8it, "Cooling Fan Bracket and Shroud for Ecksbot 3D Printer", Thingiverse, Mar. 7, 2013, <https://www.thingiverse.com/thing:58306>, last accessed Apr. 30, 2018. (Year: 2013).*

Cooper et al., "Microgravity Manufacturing Via Fused Deposition," NASA, Jul. 2003, https://ntrs.nasa.gov/archive/nasa/casi.ntrs.nasa.gov/ 20030067856.pdf.

Crockett et al., ,"Fused Deposition Modeling Microgravity," NASA, 1999, http://sffsymposium.engr.utexas.edu/Manuscripts/1999/1999078-Crockett.pdf.

* cited by examiner

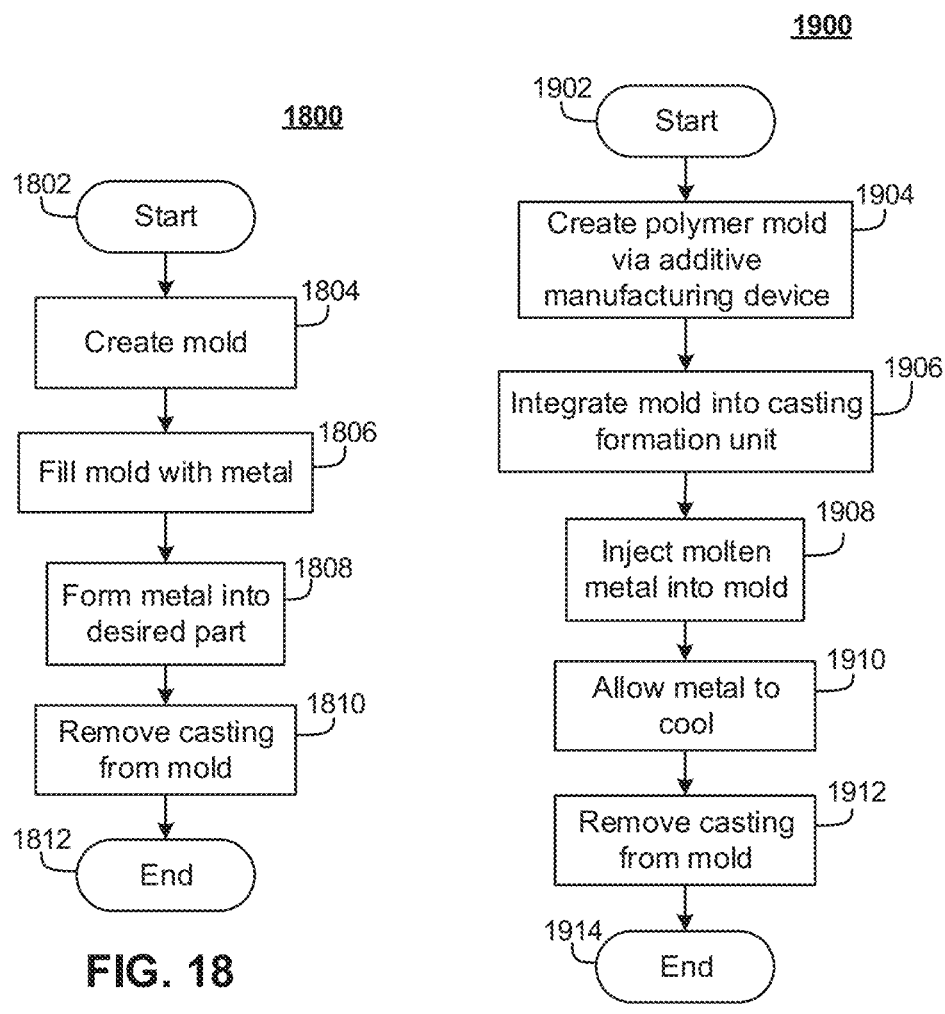

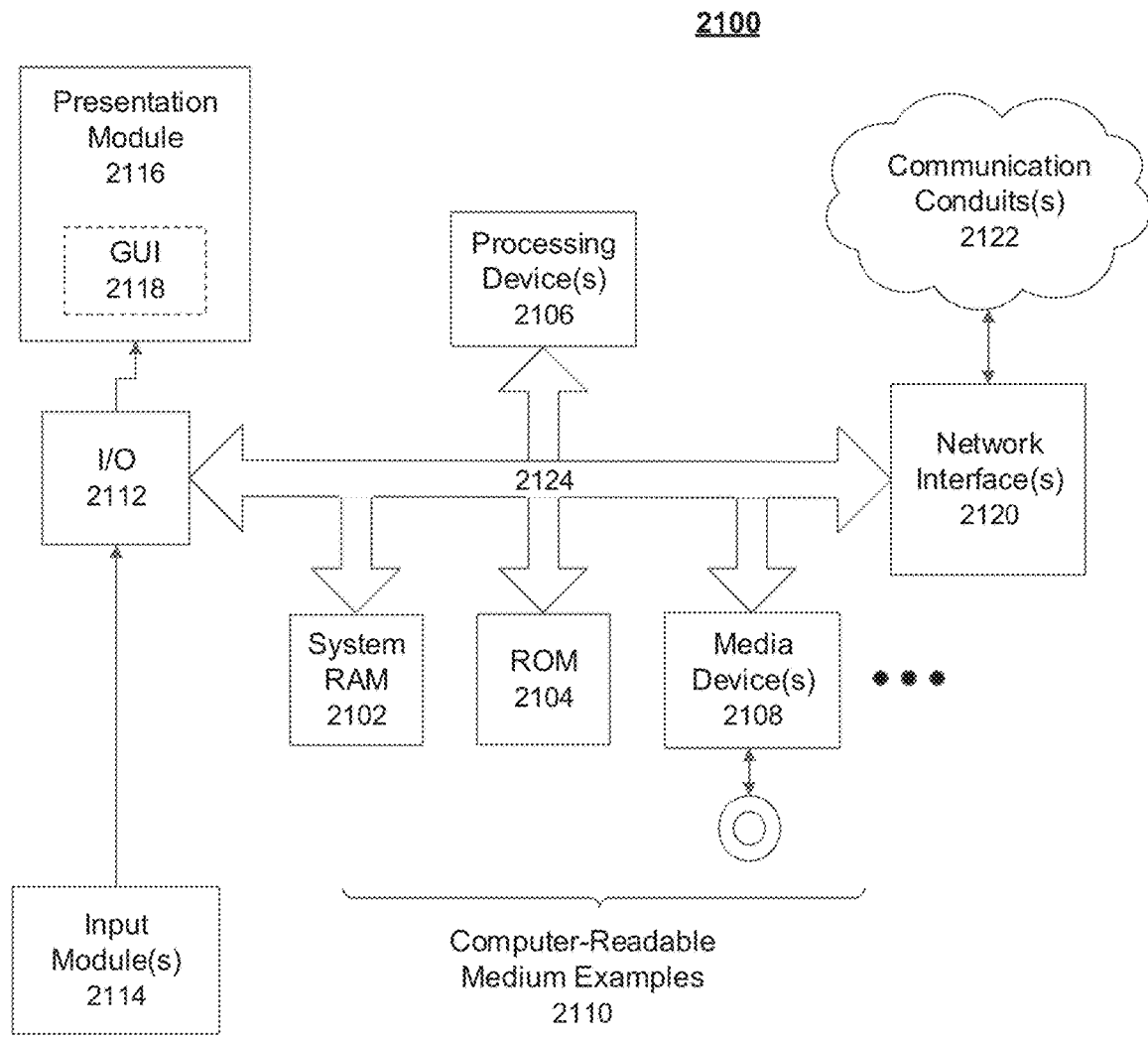
FIG. 21

METAL CASTING METHODS IN MICROGRAVITY AND OTHER ENVIRONMENTS

CROSS REFERENCE TO RELATED APPLICATION

This application claims the benefit of U.S. Provisional Patent Application No. 61/908,750, filed Nov. 26, 2013, and entitled "Metal Casting Methods In Microgravity And Other Environments," the entire contents of which are hereby incorporated herein by reference.

FIELD OF THE DISCLOSURE

The present disclosure generally relates to the production of metal objects, polymers combined with metal objects and other multi-material objects, and more particularly to apparatus and methods for casting metal objects in microgravity. Such apparatus and methods may be used in other environments.

BACKGROUND

The manufacture of metal objects is a cornerstone of modern technology, yet little effort has been made to expand this ability to microgravity environments. Without the ability to manufacture metal objects in microgravity and other non-terrestrial environments, human expansion and exploitation of these environments will be hampered.

Furthermore, while additive manufacturing has been used to produce injection molds, metal casting remains an expensive, labor-intensive, and multi-machine process.

Metal casting processes, such as the permanent mold casting process, may utilize a two part mold. In order to ease flow of the molten metal as it is poured, and to reduce thermal stresses, the mold is first preheated to between 150 and 200 degrees Celsius. Depending on the melting point of the metal used to produce the castings, the preheating temperature may be raised or lowered, or preheating may be omitted. The mold cavity is then coated with a mold wash designed to prevent the casting from sticking to the mold. The mold pieces are then clamped shut and molten metal is then poured into the mold. The metal cools, solidifying into the desired casting. The mold is then opened and the casting is removed.

The mold is typically milled from metal stock. The mold itself is significantly heavier than the castings it produces. Machining and finishing the mold is a labor- and time-intensive process. The resulting mold may be utilized to consistently produce castings with very high tolerances. The effective mold life of such molds may be between 10,000 and 120,000 castings. In order for an individual mold to be cost effective, 3,000 castings or more must be produced annually, thus such metal casting processes are only suitable for volume part production.

Casting processes may also be utilized to produce castings such as low temperature metal castings or polymer castings. In one such process, an additive manufacturing device is used to construct a mold. The mold may be a single part or multiple parts. The mold is constructed of a polymer such as acrylonitrile butadiene styrene (ABS), polycarbonate (PC), polylactic acid (PLA), high density polyethylene (HDPE), polyphenylsulfone (PPSU), or a combination of such materials.

A low temperature metal such as tin or a bismuth alloy is then poured into the mold. Such metals are be used because of the benefit of their molten characteristics at temperatures lower than the melting point of the polymer mold. The metal cools, solidifying into the desired casting. The mold may then be chipped away or otherwise removed from the casting. Such molds are typically destroyed in the removal process.

Due to considerations such as the close proximity of human astronauts and operational equipment and the otherwise sensitive environments of spacecraft (e.g., the International Space Station), out gassing of contaminants, electromagnetic interference, vibration, power requirements and excess heat must be carefully controlled. Equipment failure modes must be identified and devices must be designed which minimize risks to a spacecraft and its crew should a failure mode occur. Such considerations complicate the production of metal objects in microgravity because terrestrial production of metal objects typically requires large amounts of energy, involves significant heat, and the release of contaminants in the form of molten or solidified metal.

The ability to produce metal objects in space and on other celestial bodies is desirable for a number of reasons. Replacement parts may be produced on orbit or on site, rather than going without the part or waiting weeks or months for a resupply spacecraft to deliver the needed part. In space rapid prototyping or development of new technologies could be done more readily. Metal objects or portions of objects could be produced in microgravity would could not otherwise be produced on earth. Additionally, limited or single runs done on demand would enable in orbit production of a custom tool or other part needed for a mission.

Similarly, the ability to produce metal objects in confined environments is desired. Such environments include, but are not limited to, naval vessels, desktop settings, and the like.

Given the foregoing, apparatus and methods are needed with facilitate the production of metal objects in space, such as in a microgravity environment or on another celestial body. In particular, apparatus and methods are needed wherein metal objects may be created in close proximity to astronauts without endangering the astronauts, the spacecraft, or other equipment. On demand, custom production is needed. Additionally, apparatus and methods are needed which facilitate the casting of metal objects in confined terrestrial environments.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

Aspects of the present disclosure meet the above-identified needs by providing apparatus and methods which facilitate production of metal objects and multi-material metal objects in space via casting. Such apparatus and methods may operate in microgravity, on other celestial bodies, and/or on earth.

Aspects of the present disclosure may be used as at least a portion of a space-based production facility, creating both polymer and metal objects.

In an aspect, apparatus in accordance with the present disclosure may produce metal objects, polymer molds, polymer parts, ceramic parts, composite parts, and polymer/metal parts via an apparatus adapted for use in close proximity to astronauts or other personnel. The apparatus comprises a sealable enclosure housing an additive manufacturing device.

The additive manufacturing device comprises an extruder positionable in two axes. The additive manufacturing device further comprises a build platform positionable in a third axis. The extruder is adapted to create a desired part on the build platform via deposition of a polymer. Deposition may be done in an additive manner, such as a layer-wise or raster pattern. The positions of the extruder and the build platform may be controlled by at least one actuator in each axis. Each actuator and the extruder are controlled by a build control module. The build control module is configured to cause the desired part (e.g., a polymer mold of a wrench) to be produced by the additive manufacturing device.

The metal casting apparatus further comprises an environmental control device. The environmental control device is configured to regulate one or more of: temperature, humidity, and air quality within the metal casting apparatus. The environmental control device is configured to prevent outgassing and contamination of the environment in which the metal casting apparatus is located (e.g., a space station module) during operation of the apparatus and when the enclosure is opened to, for example, remove completed castings or polymer parts.

The metal casting apparatus further comprises a casting formation unit. The casting formation unit is configured to utilize molds produced by the additive manufacturing device to produce a metal casting. The casting formation unit comprises a metal source, an injector, and a mold remover device. The metal source contains metal stock, such as tin or a bismuth alloy. The injector is configured to received metal from the metal source and place it in a polymer mold. The mold is removably connected to the injector. The injector melts the metal, injecting the metal in a molten form. The injector may automatically inject the appropriate amount of metal into the mold. The mold remover device is configured to physically remove the mold by breaking it, allowing access to the formed casting.

In an aspect, a metal casting process is disclosed which produces metal objects in a microgravity environment via casting. A mold is created using an additive manufacturing device adapted to function in microgravity. The mold comprises one or more portions and is constructed from a polymer such as acrylonitrile butadiene styrene (ABS), polycarbonate (PC), polylactic acid (PLA), high density polyethylene (HDPE), polyphenylsulfone (PPSU), or a combination of such materials. Metal is placed in the mold by an injector. The metal may be injected as molten metal or as metal shavings or pellets. Where the injected metal is molten, the metal then cools, hardening into the desired shape, as determined by the mold. Where the metal is initially in the form of metal shavings or pellets, the mold and metal are heated to the melting point of the metal (e.g., 177-231 degrees Celsius for Tin) and subsequently cooled. The metal solidifies into the desired shape, forming a casting. The mold must then be removed. A mold remover device facilitates removal of the mold. Where the mold is a single piece, the mold remover device destructively removes the mold. The mold remover device and the enclosure of the apparatus contain portions of the removed mold, thereby preventing the surrounding environment from being contaminated. The casting may then be removed from the apparatus, providing a metal cast part for use.

The metal object is cast from tin, bismuth alloy, or similar metals having a melting point near or below the melting point of the mold used. In other aspects, the mold is created from materials with a higher melting point, such as ceramic, sand, and the like. In this manner, processes and apparatus described herein may be utilized to produce castings from metals having higher melting points (e.g., iron, copper, alloys and the like). Processes and apparatus in accordance with the present disclosure may also be used to produce castings from precious metals, such as gold, or other desired metals, combinations of materials, alloys, and other materials apparent to those skilled in the relevant art(s) after reading the description herein. In some aspects, the metal being cast has a higher melting point than the melting point of the mold. In such aspects, the mold may include active or passive cooling elements such as veins, cooling channels for a coolant, and the like. The apparatus may include cooling elements connected to the cooling channels, fans directed at the mold, and the like. The casting cavity of the mold may also be lined with an insulating material (e.g., a ceramic lining, an aluminum sheet lining, sand), thereby allowing the mold to be utilized with metals having higher melting points than the mold.

Apparatus and methods disclosed herein may be adapted for use in terrestrial environments, on other celestial bodies, or in high acceleration and vibration environments such as those found aboard a naval vessel or submarine.

In an aspect, a metal casting apparatus may be used to create metal castings instead of current multi-machine, labor intensive processes.

In an aspect, metal castings are produced via a low power process wherein the polymer mold is captured for later reuse or recycling and no metal is wasted during the casting process.

Aspects of the present disclosure facilitate the production of metal objects on demand from raw or recycled materials.

Aspects of the present disclosure facilitate the creation of metal objects in a microgravity environment which cannot be produced on earth.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

FIG. 18 is a flowchart illustrating an exemplary process for forming a metal casting, according to an aspect of the present disclosure.

FIG. 19 is a flowchart illustrating an exemplary process for forming a metal casting according to aspects of the present disclosure.

FIG. 21 is a block diagram illustrating an exemplary computer system useful for implementing aspects of the present disclosure.

DETAILED DESCRIPTION

Figure 1A:
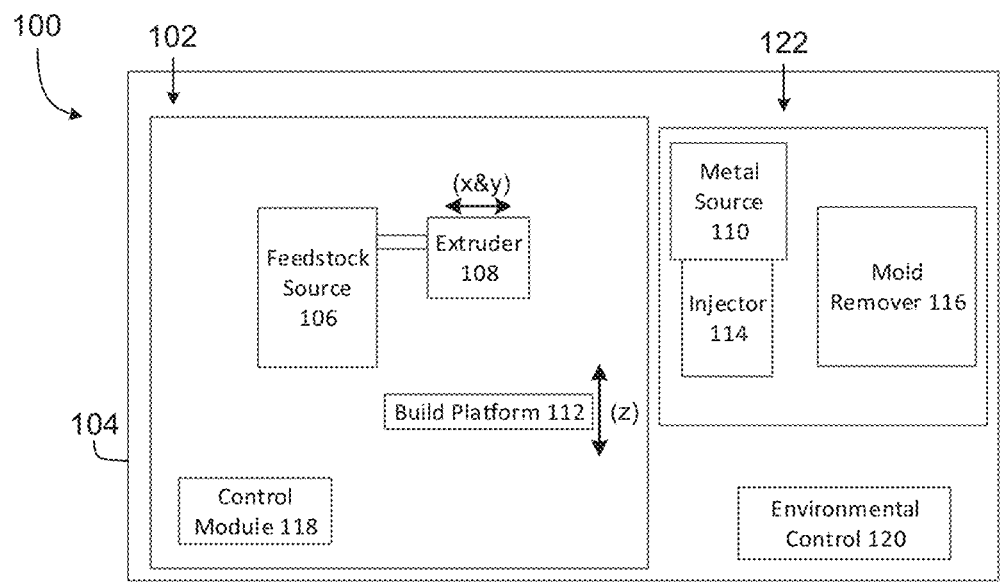
FIGS. 1A & 1B are block diagrams of exemplary metal casting apparatus, according to aspects of the present disclosure.

The present disclosure is directed to apparatus and methods which facilitate production of metal objects in space via casting. Aspects of the present disclosure also facilitate production of multi-material objects, such as polymer and metal objects. Such objects may be produced via additive manufacturing and metal casting. Apparatus and methods disclosed herein may be utilized to create a variety of metal objects desired by the user. For example, metal tools, plates, conduit and the like may be created. Wire traces, electrically conducting channels or other pieces of metal and the like may also be created. In some aspects, additively manufactured parts having internal and/or external metal components may be created. Such components may be reinforcing members, electrically conducting members (e.g., electrical lines) or other members apparent to those skilled in the relevant art(s) after reading the description herein.

Apparatus and methods disclosed herein may be configured for use in terrestrial environments, on other celestial bodies, or in high acceleration and vibration environments such as those found aboard a naval vessel or submarine.

In an aspect, a metal casting apparatus in accordance with the present disclosure may produce metal objects, polymer molds, and polymer parts. The metal casting apparatus is configured for use in close proximity to astronauts or other personnel.

Metal casting apparatus in accordance with the present disclosure utilize molds produced by an additive manufacturing device to form metal castings. The metal casting, or metal object, may be constructed of tin, bismuth alloy, or similar metals having a melting point below the melting point of the mold used. In this manner, a metal casting may be produced in a desired form via a low energy process and with minimal waste. Objects produced via this process include, but are not limited to: tools (e.g., a wrench, a hammer, a screw driver, and the like), fasteners (e.g., a screw, a nail, staples, and the like), parts (e.g., piping, valves), and assemblies (e.g., grinders, gear assemblies). Metal casting apparatus in accordance with the present disclosure may also be utilized to produce metal castings from metals having higher melting points. Molds may be produced via additive manufacturing from polymers, ceramics, wax, sand, metals and/or composites.

In various aspects, casting materials may also include gold, aluminum, tin, bismuth, silver, copper, metal alloys, other high temperature metals, thermoset polymers, thermoplastic polymers, elastomers, epoxies, composites, ceramics, glass, hybrids and other cold setting materials and other metals, combinations of materials, and alloys apparent to those skilled in the relevant art(s) after reading the description herein. Casting materials may also include regolith from the moon, Mars, or another celestial body.

In various aspects, a mold may be produced at a first location (e.g., on earth, in America) and transferred to a second location (e.g., in space, a naval vessel, a submarine, in Canada) for use in producing a metal casting.

In various aspects, the mold is produced using an additive manufacturing device integrated into the metal casting apparatus. The mold may be constructed by the additive manufacturing device from a polymer such as acrylonitrile butadiene styrene (ABS), polycarbonate (PC), polylactic acid (PLA), high density polyethylene (HDPE), polyphenylsulfone (PPSU), a combination of such materials, or another material apparent to those skilled in the relevant art(s) after reading the present disclosure. Molds may be constructed of new material, recycled material, or in-situ resources. In other aspects, the additive manufacturing device is separate from the metal casting apparatus. Molds may be made of materials having a higher or lower melting point than the metal or other material being cast. In such aspects, the mold may include active or passive cooling elements such as veins, cooling channels for a coolant, and the like. The apparatus may include cooling elements connected to the cooling channels, fans directed at the mold, and the like. The casting cavity of the mold may also be lined with an insulating material (e.g., a ceramic lining, an aluminum sheet lining), thereby allowing the mold to be utilized with metals having higher melting points than the mold. In some aspects, the mold is created from additive manufacturing feedstock comprising regolith from the moon, Mars, or another celestial body.

Figure 1B:
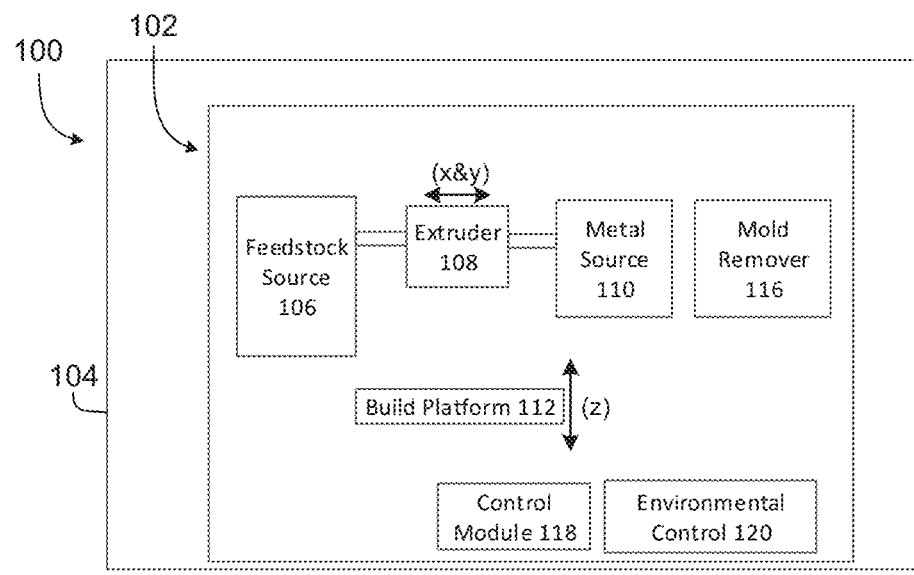

Referring now to FIGS. 1A & 1B, block diagrams of exemplary metal casting apparatus 100, according to aspects of the present disclosure, are shown.

Metal casting apparatus 100 may be a single unit, as shown in FIGS. 1A and 1B, or multiple units, as shown in FIGS. 2-7 and 12-17. Metal casting apparatus 100 is configured to produce metal castings using molds produced by an additive manufacturing device 102, or supplied from another source. Metal castings are produced within metal casting apparatus 100, thereby containing harmful outgassing and other contaminants, enabling metal casting apparatus 100 to be utilized within enclose environments and near personnel. Enclosed environments may be terrestrial or space-based environments and include, but are not limited to: a spacecraft, a submarine, an enclosed room, and a ship. Personnel include, but are not limited to: astronauts, engineers, and naval personnel.

In an aspect according to FIG. 1A, metal casting apparatus 100 comprises a sealable enclosure housing 104, additive manufacturing device 102, a casting formation unit 122, and an environmental control 120. As will be apparent to those skilled in the relevant art(s) after reading the description herein, other configurations may be used, including configurations which omit portions shown in FIG. 1A. For example, casting formation unit 122 may include environmental control 120 and mold remover 116 may be omitted. Enclosure 104 may include environmental control 120 and additive manufacturing device 102 may be positioned outside apparatus 100. Enclosure 104 need not be proprietary to apparatus 100. Rather, in some aspects, enclosure 104 is a "glove box" or other sealed volume suitable for casting metal objects using metal casting apparatus 100.

Casting formation unit 122 may include a mold retaining device (not shown in FIG. 1A) which retains the mold during casting, thereby ensuring a consistent fluidic connection between injector 114 and the mold.

Additive manufacturing device 102 comprises an extruder 108 positionable in two axes (e.g., x and y axes). Additive manufacturing device 102 may be a fused deposition-type device or any other additive manufacturing device apparent to those skilled in the relevant art after reading the description herein.

Additive manufacturing device 102 further comprises a build platform 112 positionable in a third axis (e.g., the z-axis). Build platform 112 is configured to support parts as they are being constructed. In another aspect, build platform 112 is omitted. Build platform 112 is a support which holds another part, thereby enabling additive manufacturing device 102 to add additional portions (i.e., layers) to the part being held. Actuators (not shown) are attached to extruder 108 and build platform 112. In an aspect, additive manufacturing device 102 comprises one actuator for each axis.

Extruder 108 is adapted to create a desired part on build platform 112 via deposition of a polymer or other material, as disclosed above. Deposition may be done in an additive manner, such as a layer-wise or raster pattern. The positions of extruder 108 and build platform 112 during construction may be controlled by a build control module 118, electrically connected to each actuator. Build control module 118 may be software, hardware, or a combination of software and hardware. Build control module 118 is configured to cause the desired part (e.g., a polymer mold of a wrench) to be produced by additive manufacturing device 102.

Extruder 108 is connected to a feedstock source 106. Feedstock source 106 houses and supplied material necessary to produce one or more parts via additive manufacturing device 102. In an aspect, feedstock source 106 is a spool of polymer filament threaded into extruder. Extruder 108 is configured to heat the polymer filament to its melting point and deposit the melted polymer in order to form the desired part.

Figure 16:
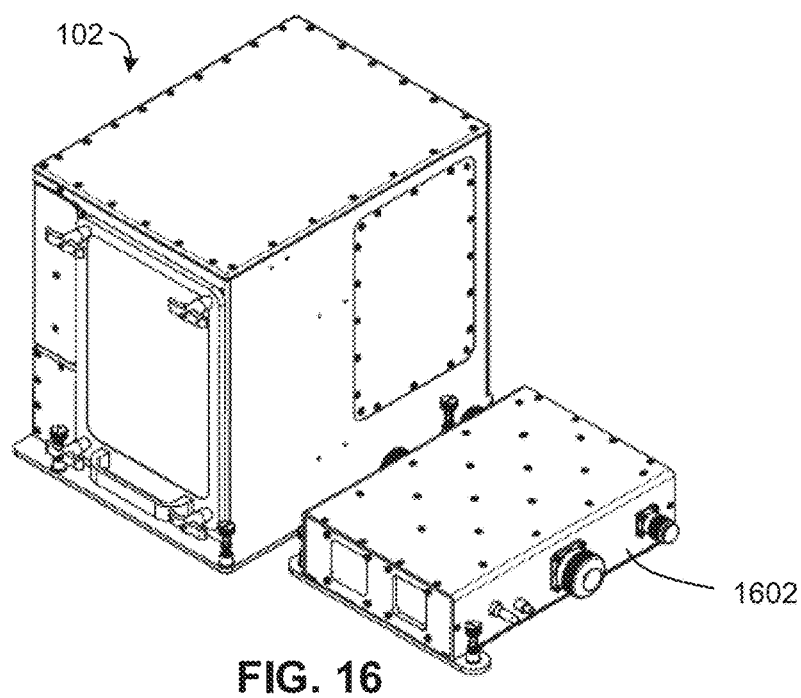
FIG. 16 is a perspective view of an additive manufacturing device useable for creating molds in a variety of locations including in space, having an external power supply, the additive manufacturing device operable in a variety of force and gravitational environments, including microgravity, according to various aspects of the present disclosure.
Figure 17:
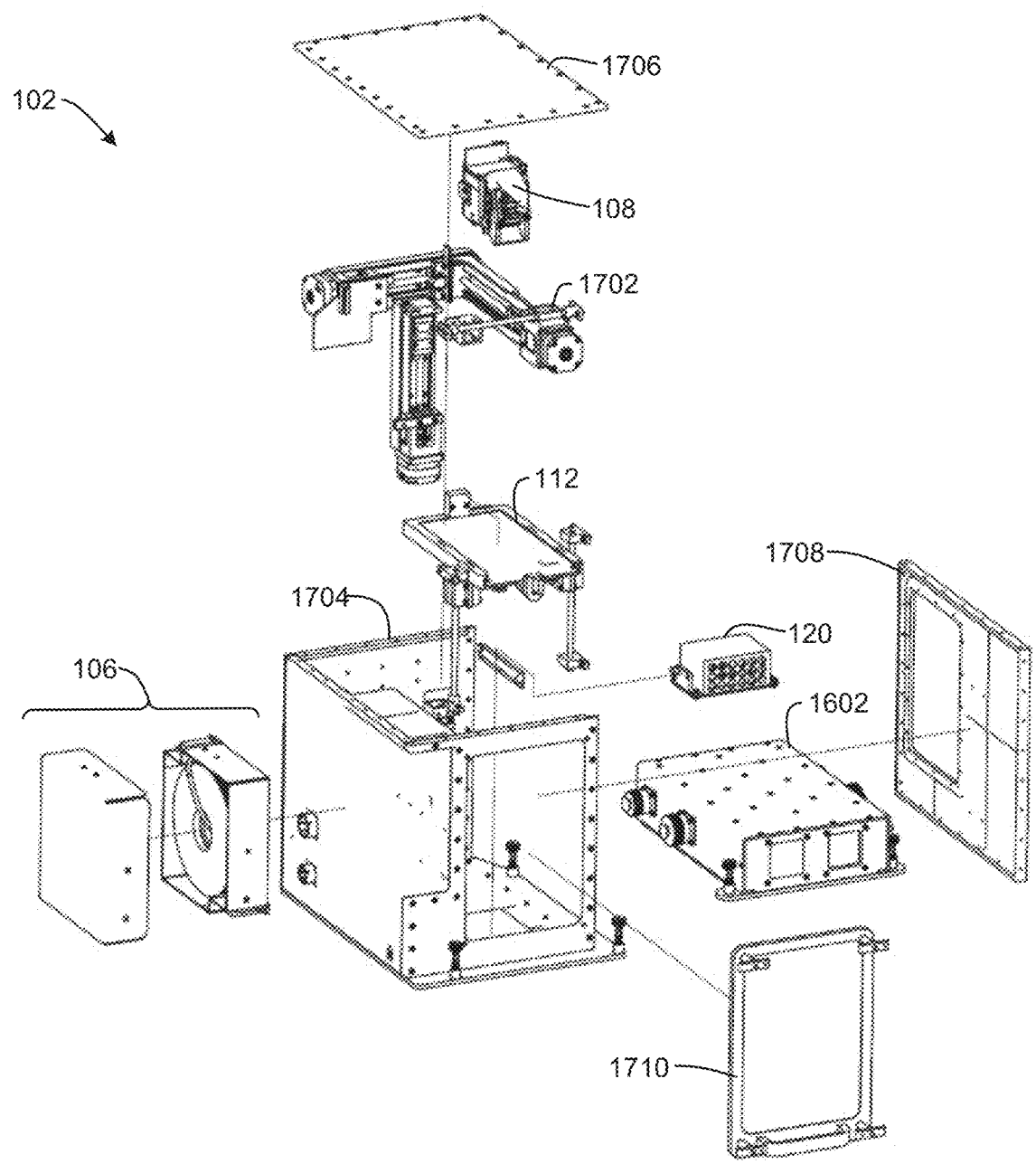
FIG. 17 is an exploded perspective view of the additive manufacturing device of FIG. 16.

In some aspects, additive manufacturing device 102 is configured as shown in FIGS. 16 & 17. Additive manufacturing device 100 and other portions of apparatus 100 may be configured according to the disclosures of U.S. patent application Ser. No. 14/331,729, entitled "Manufacturing in Microgravity and Varying External Force Environments", filed on Jul. 15, 2014 by the Applicant and incorporated herein in its entirety. Additive manufacturing device 102 may include an external power supply 1602. Additive manufacturing device 102 may include a traverse system 1702, a frame 1704, top plate 1706, side plate 1708 and door 1710. Environmental control 120 may be integrated into additive manufacturing device.

Environmental control 120 is configured to regulate the environment of metal casting apparatus 100, a portion thereof, or another enclosure containing casting formation unit 122 and/or additive manufacturing device 102. In an aspect, environmental control 120 is comprises at least one fan, a temperature regulation device (e.g., a heater, an air conditioning unit), and a filter. Environmental control 120 regulates one or more of: temperature, humidity, and air quality within metal casting apparatus 100, thereby preventing outgassing and contamination of the environment in which metal casting apparatus 100 is located during operation and when enclosure 104 is opened to, for example, remove completed castings or polymer parts.

Casting formation unit 122 is configured to utilize molds, such as those produced by additive manufacturing device 102 to produce one or more metal castings. In another aspect, casting formation unit 122 is configured to utilize polymer parts, such as those shown in FIGS. 20A & 20B, produced by additive manufacturing which comprise capillaries or other internal channels. In this manner, metal casting apparatus 100 may produce multi-material objects disclosed in more detail below with reference to FIGS. 20-21. As will be apparent to those skilled in the relevant art(s) after reading the present disclosure, additional portions of metal casting device 100 may be altered or augmented in order to facilitate production of such polymer parts, molten metal injection via, for example, capillary action, and formation of multi-material objects.

Figure 2:
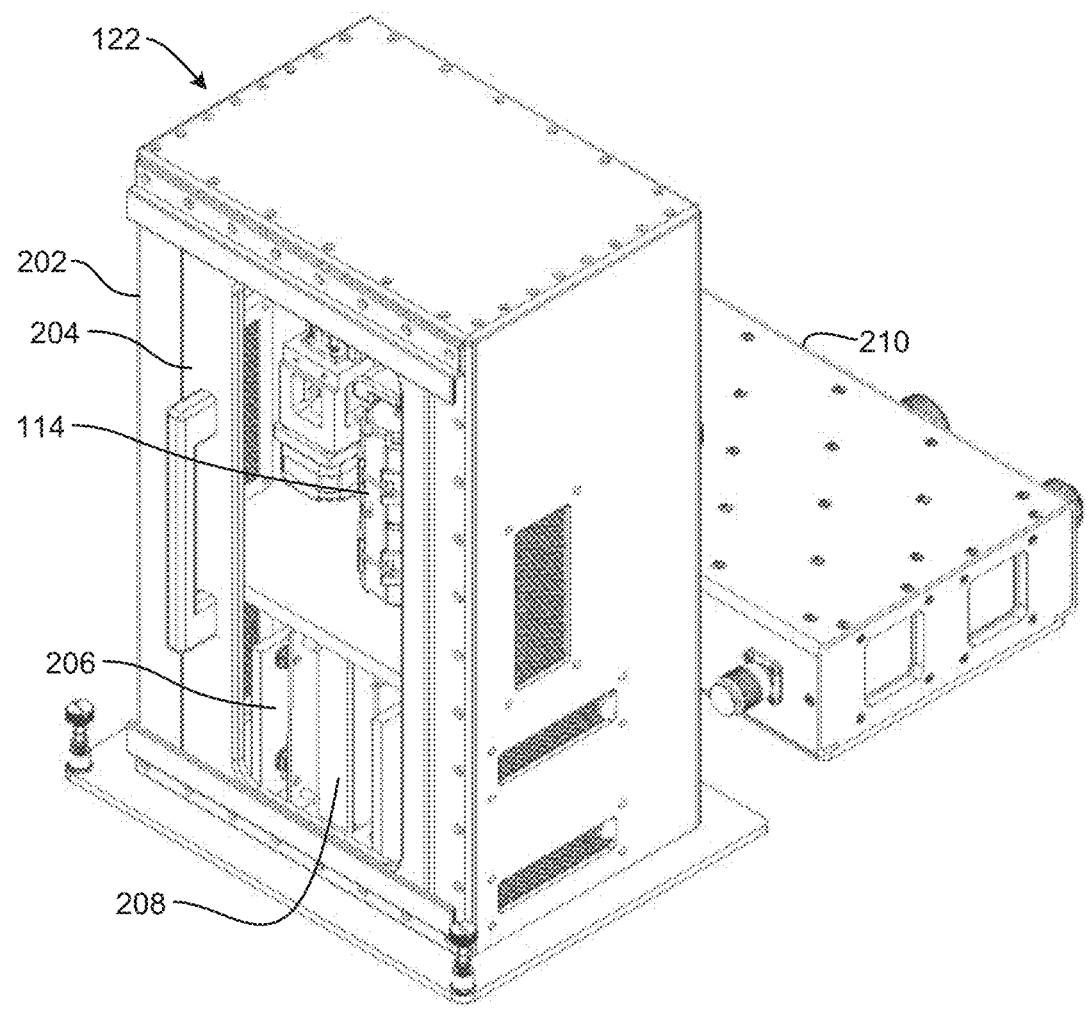
FIG. 2 is a perspective view of a casting formation unit and controlling electronics of an exemplary metal casting apparatus, according to aspects of the present disclosure.
Figure 3:
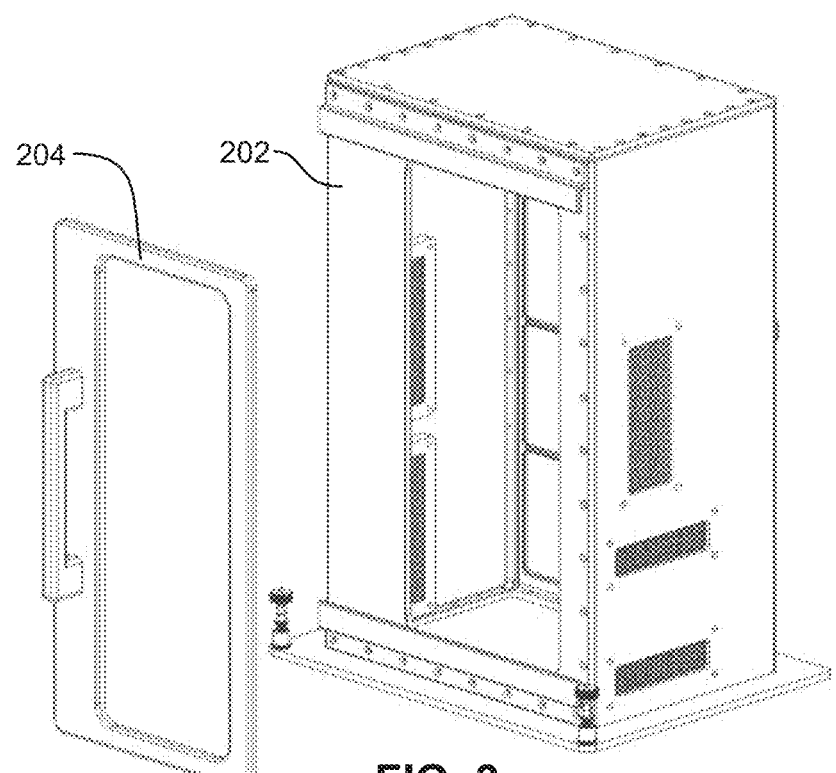
FIG. 3 is an exploded perspective view of a casting formation unit frame, according to aspects of the present disclosure.

In an aspect, casting formation unit 122 comprises a metal source 110, an injector 114, and a mold remover device 116. Metal source 110 contains metal stock, such as tin or a bismuth alloy. In an aspect, metal contained in metal source 110 is a filament. In another aspect, metal contained in metal source 110 comprises shavings, pellets or other discrete portions of the metal. Metal source 110 is connected to injector 114. Injector 114 is configured to removably attach to a mold and insert metal into the mold in order to form a casting from the injected metal. Injector 114 is configured to received metal from metal source 110 and place it in a polymer mold. As shown in FIG. 2, casting formation unit 122 may also include a mold retaining device 206 for positioning the mold during casting.

In an aspect, injector 114 heats metal from metal source 110 and injects the molten metal into the attached mold. The molten metal conforms to the mold and then cools, forming a casting. Injector 114 may further comprise a mold evacuator (not shown in FIGS. 1A & 1B), configured to evacuate atmosphere from the mold, causing the resultant vacuum to uniformly distribute molten metal within the mold.

In another aspect, solid metal is placed within the mold via injector 114. Casting formation unit 122 further comprises a heater (not shown) which heats the mold and metal therein past the melting point of the metal. The molten metal conforms to the shape of the mold and is then allowed to cool, forming the desired casting.

Mold remover 116 is configured to remove the casting from the mold after the casting has solidified. In an aspect, the mold is a multi-part mold coated with a mold wash. Mold remover 116 may be manually or automatically actuated to remove the portions of the mold from the casting. In another aspect the mold is a one part mold. Mold remover 116 may be, for example a cutting or grinding tool, configured to destructively remove the mold from the casting. Mold remover 116 may be configured to chemically dissolve the mold as, for example, through the application of acetone to a polymer mold. Mold remover 116 may be another device or combination of devices apparent to those having skill in the relevant art(s) after reading the description herein. Mold remover 16 is configured to remove the mold from the casting within enclosure 104, thereby limiting contamination of the surrounding environment.

In an aspect according to FIG. 1B, portions of casting formation unit 122 may be integrated into additive manufacturing device 102, thereby omitting portions of casting formation unit 122. In one such aspect, extruder 108 is configured to both receive polymer filament from feedstock source 106 and to receive metal filament from metal source 110. Extruder 108 may be utilized to create polymer parts via additive manufacturing (e.g., molds). Extruder 108 is further configured to heat the received metal filament until the filament melts and to interface with a mold such that the melted metal filament is injected into the mold. In this manner, extruder 108 also functions as injector 114.

Referring now to FIG. 2 a perspective views of casting formation unit 122, according to aspects of the present disclosure, is shown. In order to provide power to apparatus 100, an external power supply 210 may be included. In some aspects, the total power consumed by apparatus 100 during a casting does not exceed 800 watts. Casting formation unit 122 may include casing 202, providing protection to users and equipment. Casting formation unit 122 may include a door 204, such as the sliding door shown in FIGS. 2 & 3. Casting formation unit 122 may include an injector 114 which supplied metal to be cast in a mold 208 and mold retaining device 206. Mold retaining device 206 may be a clamping device, as shown, a plurality of straps, a recess, or any other configuration apparent to those skilled in the relevant art(s) after reading the description herein for holding mold 208 during casting.

Figure 4:
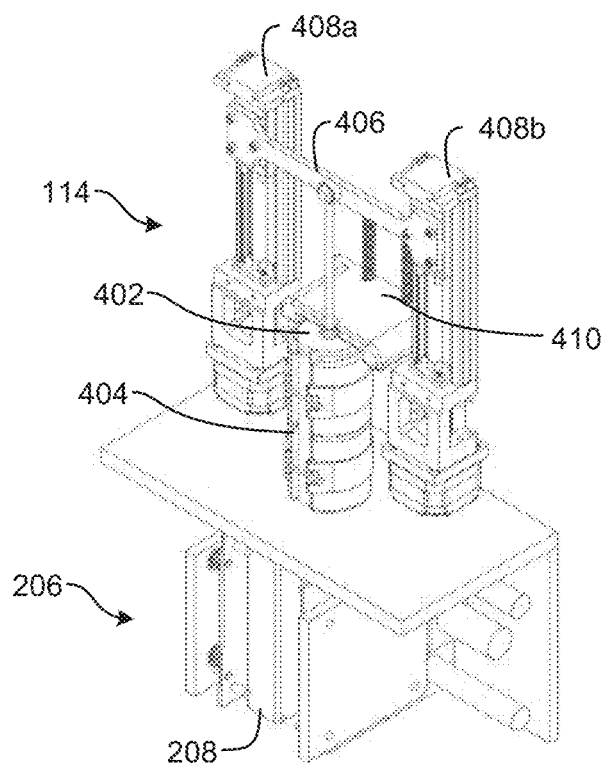
FIG. 4 is a perspective view of an injector and mold retaining device of a casting formation unit, according to aspects of the present disclosure.

Now referring to FIG. 4, a perspective view of injector 114 and a mold retaining device 206 of casting formation unit 122, according to aspects of the present disclosure, is shown.

Injector 114 is a device for placing metal into mold 208. Metal may be molten metal. In other aspects, injector 114 introduces metal shavings, pellets, or the like into mold 208 for heating by other portions of casting formation unit 122. In an aspect, injector 114 is a plunger 402 and cylinder 404 design. Plunger 402 is positioned by two actuators 408 (shown as actuators 408a-b in FIG. 4) controlled by controlling electronics. Actuators 408 connect to a crossmember 406 connected to plunger 402. A spring-loaded retainer 410 is positioned at the top of cylinder to prevent inadvertent extraction of plunger 402 from cylinder 404. Cylinder 404 contains metal which will be injected into mold 208. Cylinder 408 includes heating elements to melt the metal and maintain the metal at the appropriate temperature. Cylinder 404 may also contain temperature sensors. Plunger 402 may be configured in a variety of shapes including a planar plunger, a solid cylinder, a cylinder and gasket assembly, and an auger.

Figure 5:
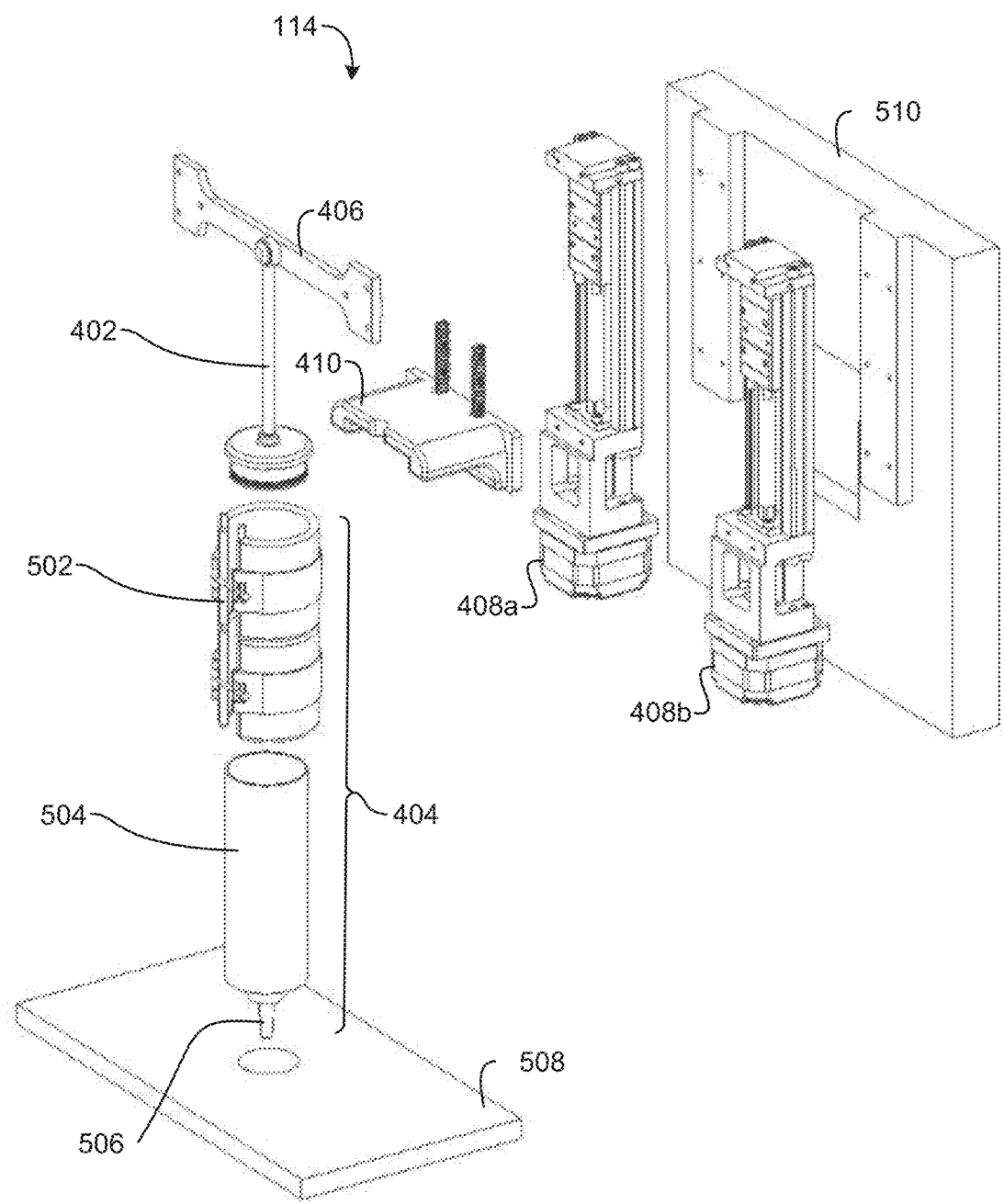
FIG. 5 is an exploded perspective view of an actuator-driven injector, according to aspects of the present disclosure.

Now referring to FIG. 5, an exploded perspective view of actuator-driven injector 114, according to aspects of the present disclosure, is shown.

Injector 114 may be mounted on a mounting plate 510. Injector 114 may include a nozzle 506 for injecting metal into mold 208. Cylinder 404 may include an out grip 502 and an inner removable tube 504. In this manner, the metal being injected can be easily switched and injector 114 may be serviced.

Figure 6:
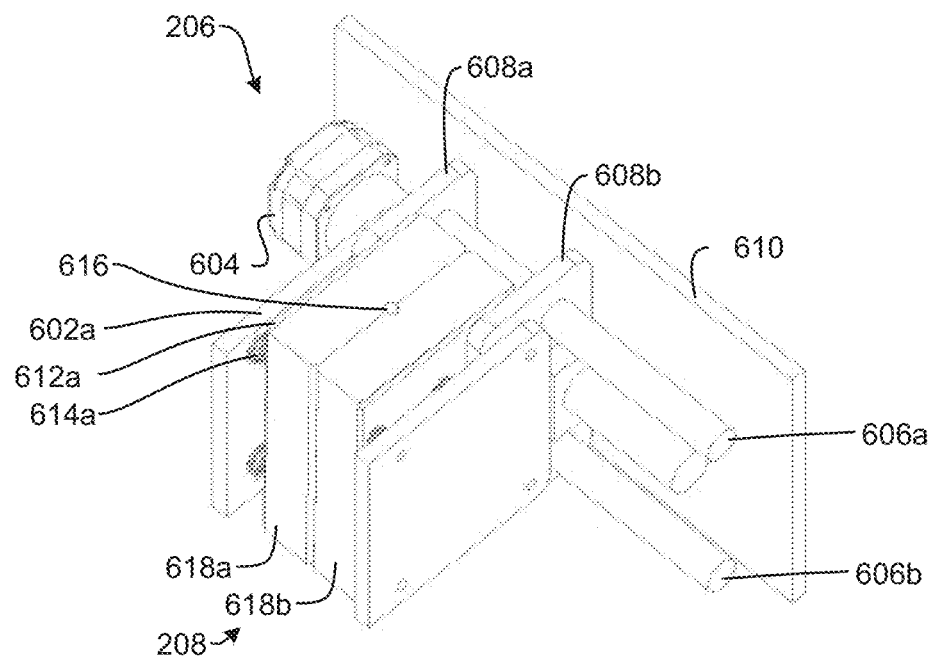
FIG. 6 is a perspective view of a mold retaining device, according to aspects of the present disclosure.
Figure 7:
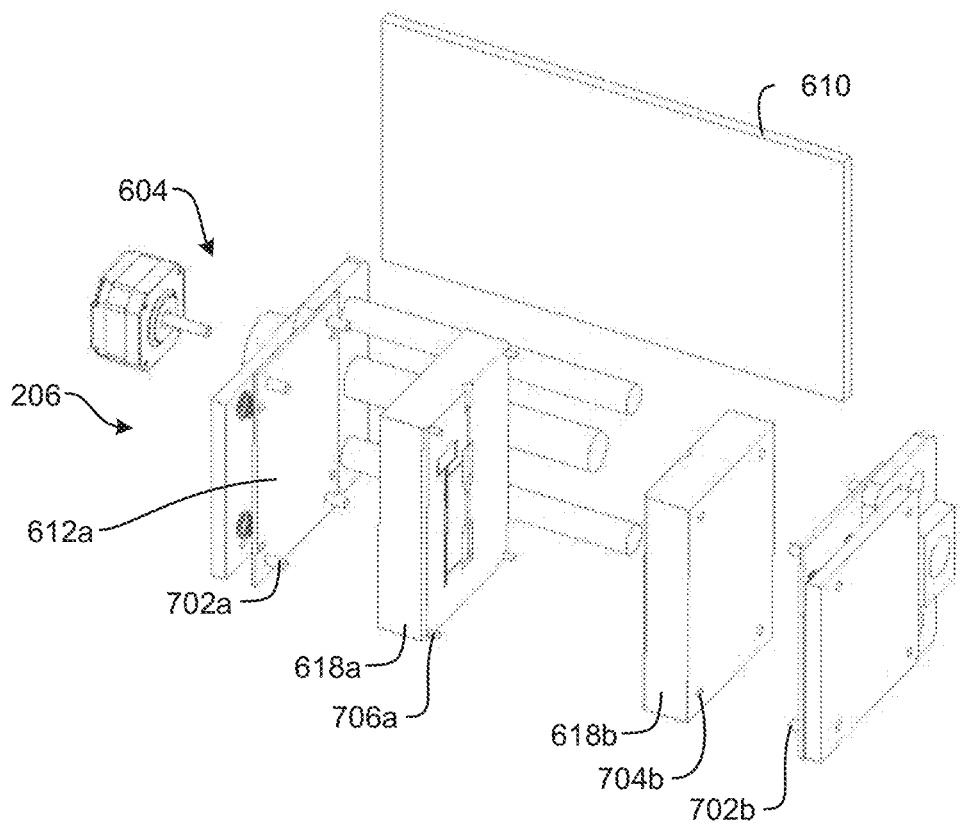
FIG. 7 is an exploded perspective view of a mold retaining device including a two-part mold, according to aspects of the present disclosure.

Now referring to FIGS. 6 & 7, perspective and exploded views of mold retaining device 206 and mold 208, according to aspects of the present disclosure, are shown.

Mold retaining device 206 may be a clamping device actuated by a linear actuator 604. Mold retaining device 206 may be mounted on retaining plate 610. Two drive plates 608 (shown as drive plates 608a-b in FIGS. 6 & 7) are retain mold 208 via connection plates 612 (labeled, for clarity, only as connection plate 612a in FIGS. 6 & 7). In some aspects, one or both drive plates 602 are moved by actuator 604. Guide rails 606 (labeled as guide rails 606a-b in FIG. 6) stabilize drive plates 602. Each connection plate 612 is connected to a corresponding drive plate 602 via springs 614 (labeled, for clarity, only as spring 614a in FIG. 6). In some aspects, connection plates 612 include one or more mold retainers 702 (labeled, for clarity as mold retainers 702a-b in FIG. 7). Mold retainer 702 may be a pin insertable into a retaining structure 704 (labeled, for clarity, only as retaining structure 704b in FIG. 7) formed in mold 208.

Injector 114 may force molten metal into mold 208 at one or more injection points 616. Mold 208 may include only or more mold parts 618 (shown as mold parts 618a-b in FIGS. 6 & 7). Mold 208 may additionally comprise one or more evacuation points, configured to interface with a mold evacuator (not shown in FIGS. 6 & 7). Each mold part 618 may include connectors such as pin 706 (labeled, for clarity, only as pin 706a in FIG. 7) and channel (not shown in FIG. 7) which facilitate correct alignment and joining of each mold part 618.

Figure 8:
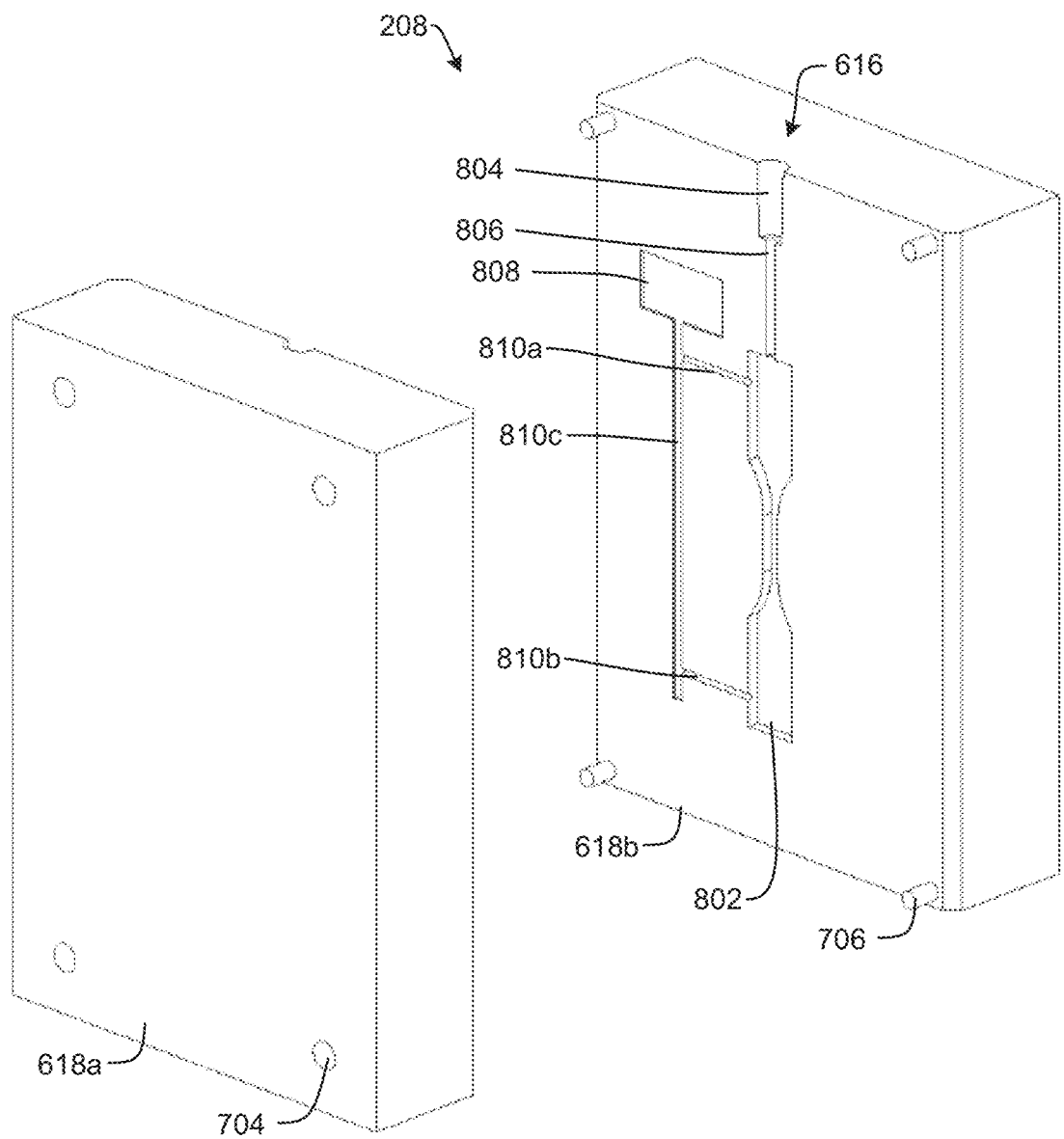
FIG. 8 is an exploded perspective view of a two-part mold, according to aspects of the present disclosure.

Referring now to FIG. 8, an exploded perspective view of a two-part mold 208, according to aspects of the present disclosure, is shown Mold 208 is created by additive manufacturing device 102 and includes a casting cavity 802, injection point 616, and one or more vent cavities 808 connecting to casting cavity 802 via channels 810 (labeled as channels 810a-c in FIG. 8). In some aspects, vent cavity 808 and channels are omitted. For instance, vent cavities 808 and channels 810 may be omitted where mold evacuator 1202 is utilized. Channels 810 are positioned around casting cavity 802 at intervals chosen to ensure the casting is successful and nor air is trapped within casting cavity 802, thereby fouling the casting. In some aspects, such as microgravity deployment of apparatus 100, the width of channel is chosen such that the surface tension of molten metal injected into mold 208 prevents significant amounts of metal from entering channel 810. Thus air may be pushed into vent cavity 808, allowing the metal to form a cast within casting cavity 802 without significant metal loss.

Injection point may connect to nozzle cavity 804, housing nozzle 506 during casting and connecting to entrance channel 806. In some aspects, a mold liner such as metal foil may be placed within casting cavity 802 and/or other portions of mold 208 in order to facilitate easy release of the cast object and reuse of mold 208. Mold 208 may further include one or more cooling channels, one or more cooling veins, or other structure designed to facilitate active or passive cooling of mold 208. In this manner, mold 208 may be utilized to produce castings from metals having a melting or flow temperature higher than the melting point of the mold 208 material. Apparatus 100 may include one or more cooling units configured to actively cool mold 208 during casting. Cooling units may be water or other liquid cooling units, connected to cooling channels within mold 208. Cooling units may be fans or other air handlers. Mold 208 may include a mold liner positioned within casting cavity 802 and chosen to insulate or otherwise protect mold 208 from the metal injected into casting cavity 802. The mold liner may facilitate removal of the cast part after casting is complete. The mold liner may be, for example, a flexible aluminum lining, a ceramic material, or the like.

Figure 9:
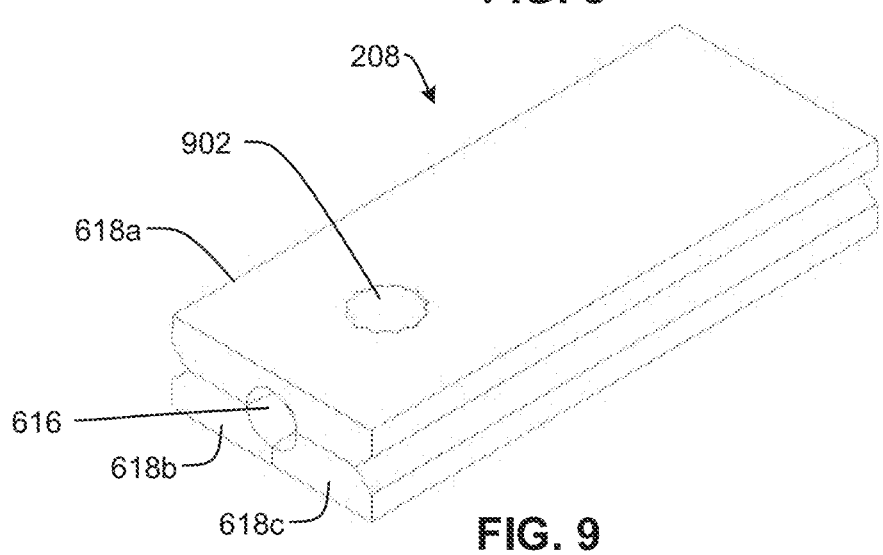
FIG. 9 is a perspective view of a multi-part mold with an insert, according to aspects of the present disclosure.
Figure 10:
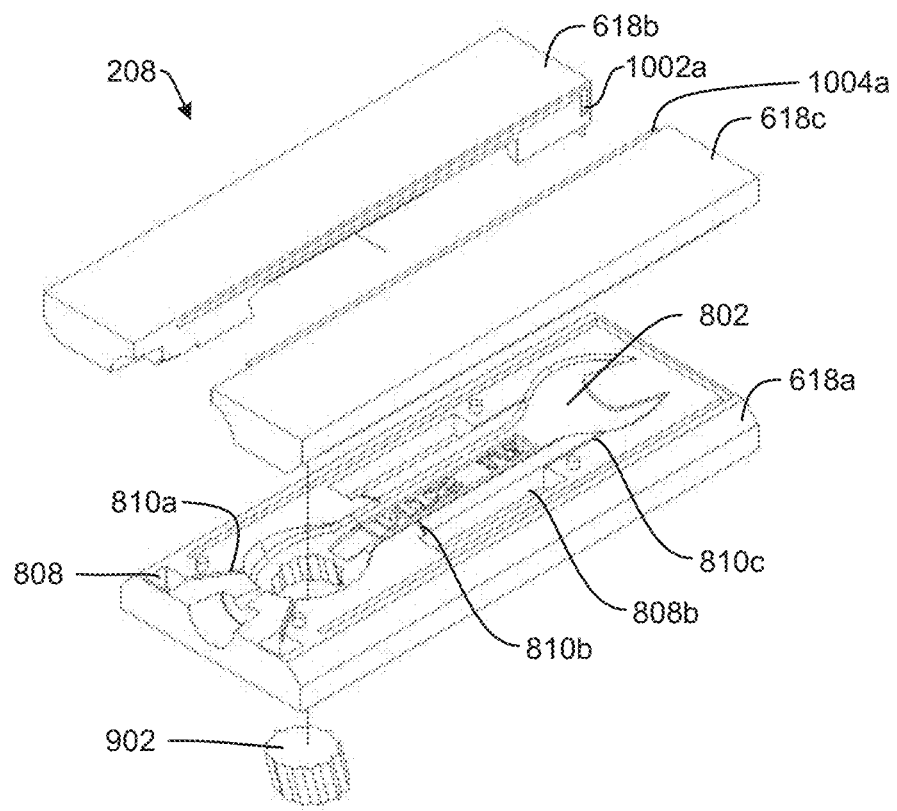
FIG. 10 is an exploded bottom perspective view of the multi-part mold of FIG. 9, according to aspects of the present disclosure.
Figure 11:
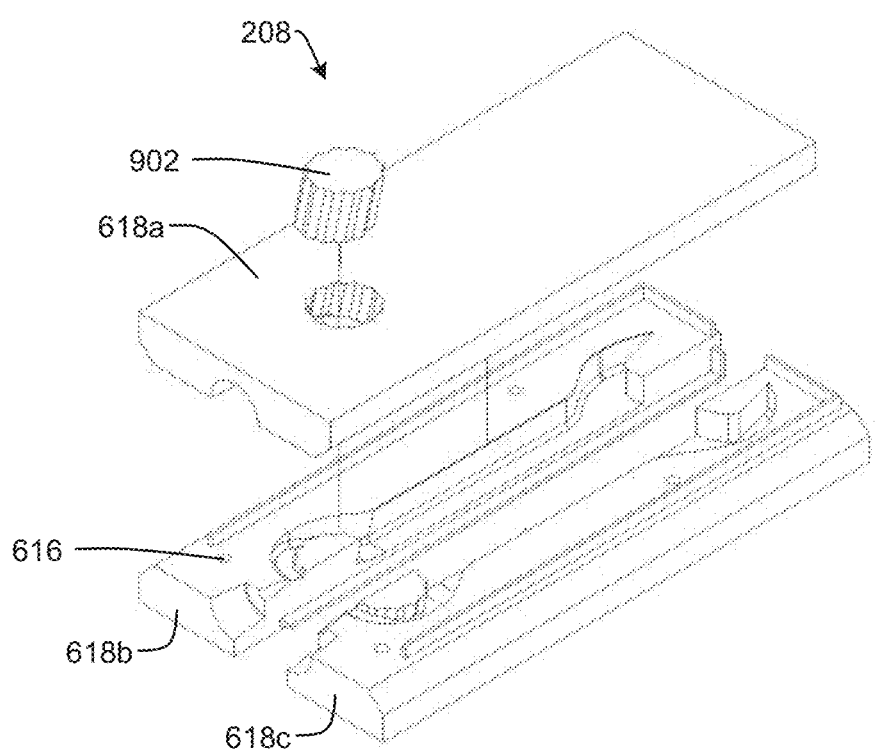
FIG. 11 is an exploded top perspective view of the multi-part mold of FIG. 9, according to aspects of the present disclosure.

Referring now to FIGS. 9-11, various views of a multi-art mold 208, according to aspects of the present disclosure, are shown.

Mold 208, such as the mold of FIGS. 9-11 for casting a wrench, may be constructed of multiple mold parts 618*a-c* and inserts 902. Mold parts 618 and inserts 902 need not be the same material and may be created by multiple additive manufacturing devices 102. In some aspects, connectors joining mold parts 618 together may be a tongue 1004 and groove 1002 configuration.

Figure 12A:
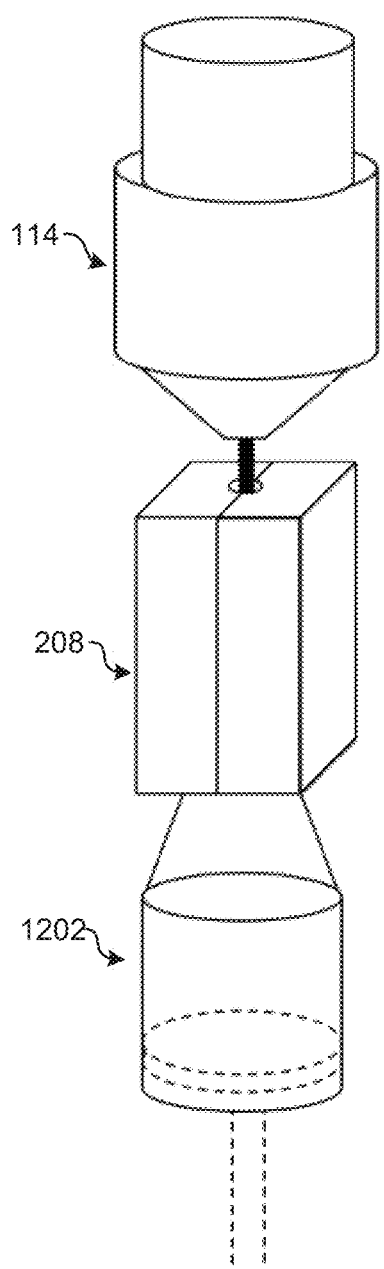
FIGS. 12A & 12B are illustrations of portions of a metal casting apparatus including an injector, mold and evacuator, according to aspects of the present disclosure.
Figure 12B:
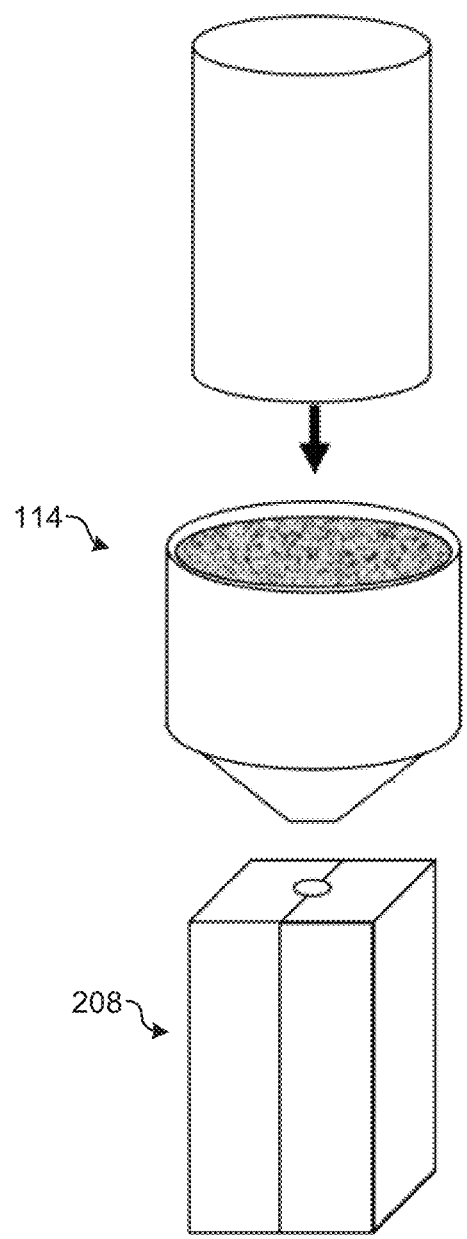

Referring now to FIGS. 12A & 12B, illustrations of portions of metal casting apparatus 100 including injector 114, mold 208 and mold evacuator 1202, according to aspects of the present disclosure, are shown.

Casting formation unit 122 may comprise injector 114. This injector 114 is configured to force metal feedstock into mold 208. Mold evacuator 1202 is configured to pull metal into mold by creating at least a partial vacuum or pressure differential within mold 208. Mold evacuator 1202 may be a plunger assembly, as shown. In other aspects, mold evacuator 1202 may expose mold to vacuum from space. In yet other aspects, mold evacuator 1202 may be a vacuum pump. As metal is injected into mold 208 via injector 114, mold evacuator 1202 evacuates atmosphere from mold 208 by, for example, retracting the plunger, thereby pulling the metal into mold 208. In an embodiment, the mold evacuator is a valve configured to expose the casting cavity to vacuum.

Figure 13:
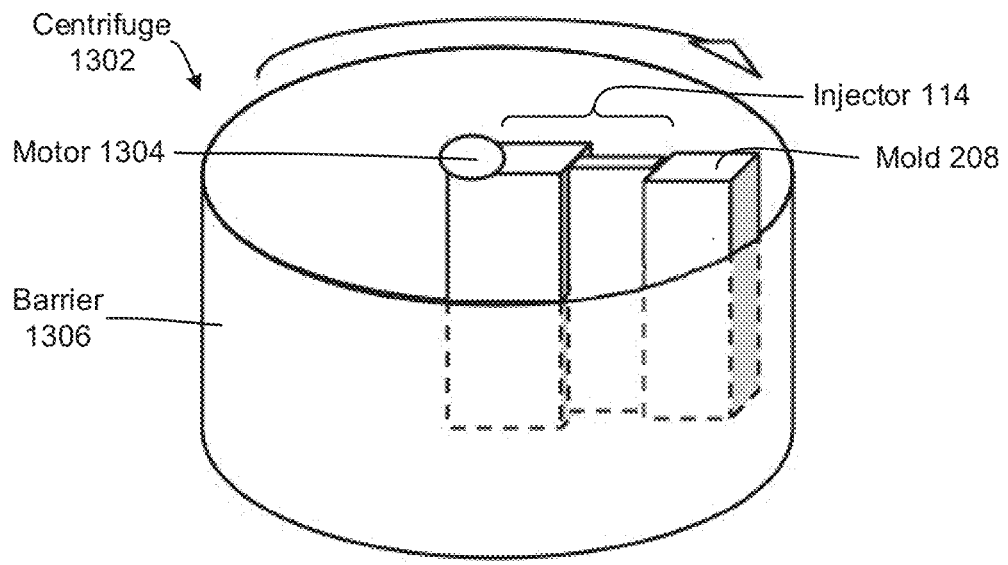
FIG. 13 is an illustration of portions of a metal casting apparatus including a centrifuge, according to aspects of the present disclosure.
Figure 14:
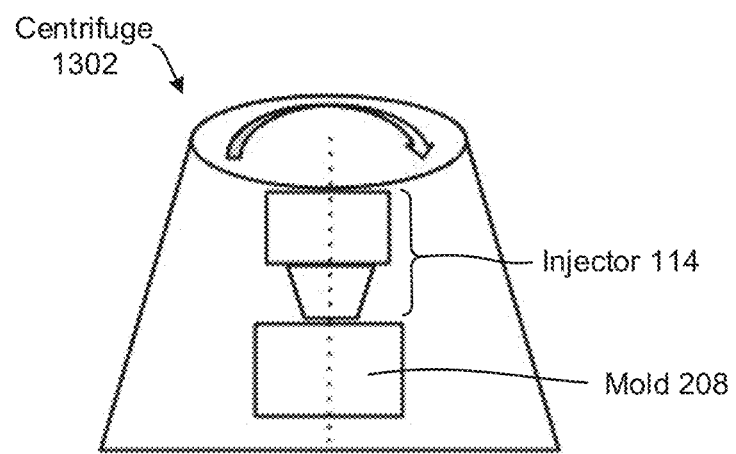
FIG. 14 is an illustration of portions of a metal casting apparatus including a centrifuge, according to aspects of the present disclosure.

Referring now to FIGS. 13 & 14, portions of a metal casting apparatus including a centrifuge, according to aspects of the present disclosure, are shown.

In some aspects, apparatus 100 includes a centrifuge 1302 for creating the desired force for casting in a microgravity environment. Injector 114 releases metal which is forced into mold 208 by rotation of centrifuge 1302. Centrifuge 1302 may be a cylindrical design, an angled design, or any other design apparent to those skilled in the relevant art(s) after reading the description herein. A motor 1304 is provided to power the centrifuge 1302. Also shown is a barrier 1306 located around the injector 114 and mold 208.

Figure 15:
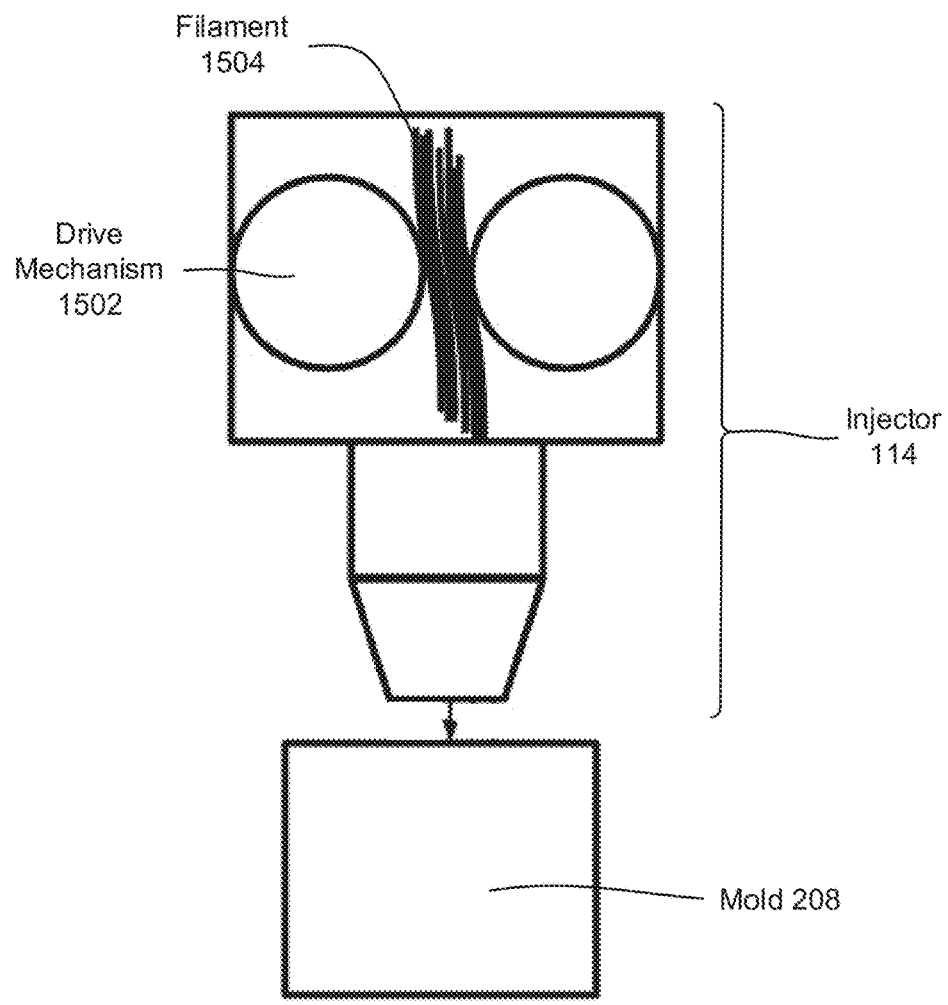
FIG. 15 is an illustration of portions of a metal casting apparatus including a multi-material extruder operating as an injector, according to aspects of the present disclosure.

Referring now to FIG. 15, an illustration of portions of a metal casting apparatus including a multi-material extruder operating as an injector, according to aspects of the present disclosure, is shown.

As shown in FIG. 1B, apparatus 100 may include a single extruder 108 used to create mold via additive manufacturing processes and inject metal into the completed mold 208. In this manner, mold 208 may be created using, for example, a thermoplastic filament from feedstock source 106 and remain bonded to build platform 112. Subsequently, metal filament from metal source 110 may be fed into extruder, which also serves as injector 114. Thus both metal and thermoplastic filament 1504 may be utilized by the extruder/injector. The metal filament may be melted and injected into mold 208, creating a cast object having metallurgical and structural properties of a cast object, rather than an additively manufactured metal part. A drive mechanism 1502 is utilized to feed feedstock 1504 into extruder 108.

Referring now to FIG. 18, a flowchart illustrating an exemplary process 1800 for forming a metal casting, according to an aspect of the present disclosure, is shown.

Process 1800, at least a portion of which may utilize computing functionality 2100, as shown in FIG. 21, and metal casting apparatus 100 to produce a metal casting from a mold, begins at step 1802 with control passing immediately to step 1804.

At step 1804, mold 208 is created. Mold 208 may be created using additive manufacturing device 102. In another aspect, mold 208 is created off site and shipped, flown, or otherwise transported to metal casting apparatus 100.

At step 1806, mold 208 is filled with metal from metal source 110. As disclosed above, in an aspect mold 208 may be filled with molten metal delivered from injector 114. In another aspect, mold 208 may be filled with molten metal delivered by extruder 108. In yet another aspect, mold 208 may be filled with solid metal. In each aspect, additional portions of metal casting apparatus 100 may facilitate injection of the metal into mold 208. For example, mold evacuator 1202 may remove air from mold 208, creating a vacuum with pulls the metal into mold 208. In another aspect, mold 208 is spun in centrifuge 1302 and the associated forces cause the metal to fill mold 208.

At step 1808 the metal injected into mold 208 in step 1806 is formed into the desired part via casting. In an aspect, the injected molten metal cools, forming the desired casting. In another aspect, mold 208 and metal are heated until the metal melts. The metal and/or mold 208 are then actively or passively cooled, forming the desired casting.

At step 1810, the casting is removed from mold 208. In an aspect, mold remover 116 is utilized to remove the casting from mold 208. In another aspect, a human operator removes the casting.

Process 1800 then terminates at step 1812.

Referring now to FIG. 19, a flowchart illustrating an exemplary process 1900 for forming a metal casting according to an aspect of the present disclosure, is shown.

Process 1900, at least a portion of which may utilize computing functionality 2100, as shown in FIG. 21, and metal casting apparatus 100 to produce a metal casting from mold 208, begins at step 1902 with control passing immediately to step 1904.

At step 1904 additive manufacturing device 102 creates mold 208 of a part, such as a tool. Mold 208 may be a single part mold created according to electronic plans uploaded to control module 118.

At step 1906, mold 208 is integrated into casting formation unit 122.

At step 1908, molten metal is injected into mold 208.

At step 1910, the molten metal cools, forming the desired casting.

At step 1912, the casting is removed from mold 208 by mold remover 116. In other aspects, a human operator removes the casting.

Process 1900 then terminates at step 1914.

Figure 20A:
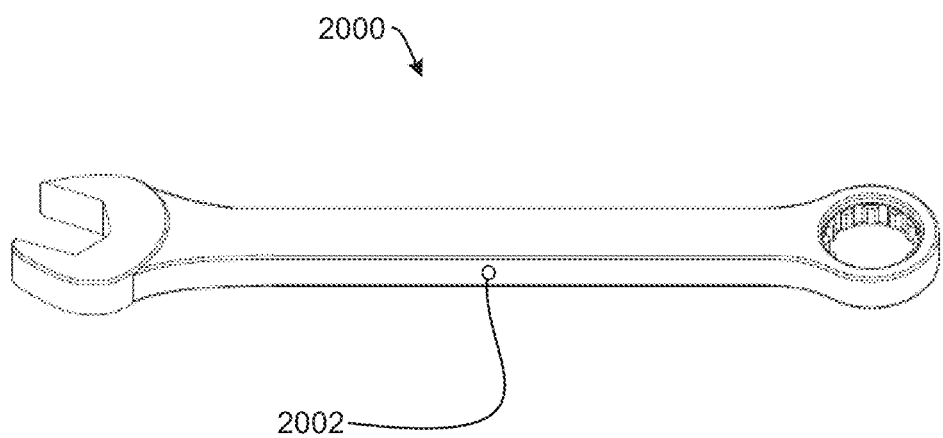
FIGS. 20A & 20B are views, including a cutaway view, of an additively manufactured object having an internal structure configured for metal casting, according to aspects of the present disclosure.
Figure 20B:
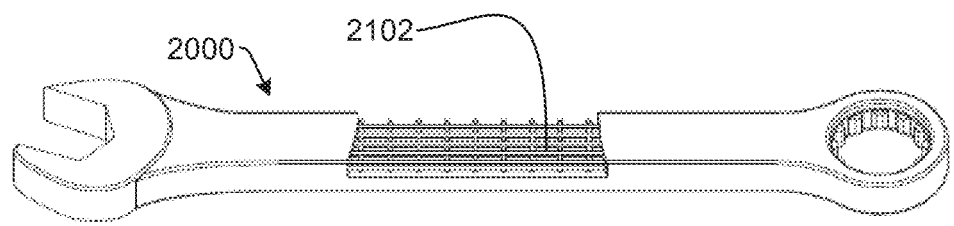

Referring now to FIGS. 20A & 20B, an illustration of an exemplary part created via additive manufacturing including a plurality of channels 2102 for metal injection at one or more injection points 2002 and reinforcement and/or alteration of the part's properties, according to an aspect of the present disclosure, is shown.

Additive manufacturing excels in creating complex structures rapidly, but often fails to create parts that are strong enough, or possess other important properties (such as conduction). This is particularly true of extrusion-based additive manufacturing, which has other advantages which make it suitable for use in certain environments. This type of additive manufacturing, however, can be used to create molds 208 which can then be used to cast the resulting part out of a material with more desirable properties (e.g. a metal).

Additive manufacturing devices 102 may produce parts which are ill suited for production use. Additive manufacturing enables parts to be designed with internal channels and capillaries. Via appropriate design, parts produced with such an internal structure may be produced and subsequently cast in metal. In particular, the capillary action of liquids in microgravity may be leveraged, causing molten metal to fill the printed capillaries within the part. Such molten metal may be hardened via cooling, creating a rigid internal structure to the printed part. This creates a hybrid metal and polymer structure, increasing the strength, durability and other desirable properties of the part. In an aspect, remaining polymer portions of the part need not be removed. Rather, they form part of the finished object.

FIG. 20 illustrates additional aspects of this capillary design.

By manufacturing a part with appropriately designed channels inside, capillary forces can be used to wick liquid material through the part. When this liquid cools, the end result is a multi-material part with more desirable properties. In particular, this usage of capillary action is advantageous in a reduced gravity environment, but the advantages of this technology are not limited to such environments.

In an aspect, a part 2000 comprising capillaries 2102 and other narrow channels is produced via additive manufacturing which has the overall shape of the desired final object. Part 2000 is then filled with molten metal using capillary action (or other method dependent on pressure differential or gravity potential or centrifugal force or other fluid transfer method). The molten metal (or other material) may be injected into part 2000, where it will fill specially designed channels inside part 2000. After cooling, the resulting part 2000 is comprised of two materials—one that was additively manufactured and the other that was injected through the capillary veins within part 2000. Rather than attempting to then remove an outer mold, the resulting part 2000 now gains the synergistic benefit of both materials and of the advantages that can be factored into the design. Electric circuits, antenna, transmitters, transceivers and other electrical equipment may be produced in this manner. Apparatus and methods disclosed herein for producing such parts may be used on Earth, in space or on other celestial bodies, depending on configuration. In some aspects, multiple materials may be selectively introduced into capillaries 2102 and channels within part 2000 including conductors, semi-conductors and insulators. Satellite components and other parts useful in space or off-Earth may be produced in this manner from bulk materials or feedstock.

Conventionally, the binding of casted material to the mold is considered to be a problem, not an advantage. In such hybrid objects as disclosed herein, the binding the casting to the additively manufactured part 2000 is a benefit. Aspects of this capillary-based casting process allow new geometries and new structures to be designed and developed. By taking advantage of optimized design for the capillary channels to be cast, the end part can have exceedingly high strength to weight characteristics. As will be apparent to those skilled in the relevant art(s) after reading the description herein, process 1800 and process 1900 may be modified to produce the above disclosed capillary-action based multi-material parts 2000. In such aspects, no mold removal step is required.

Referring to FIG. 21, a block diagram illustrating an exemplary computer system useful for implementing an aspect of the present disclosure, is shown.

FIG. 21 sets forth an illustrative computer system that may be used to implement computing functionality 2100, which in all cases represents one or more physical and tangible processing mechanisms.

Computing functionality 2100 may comprise volatile and non-volatile memory, such as RAM 2102 and ROM 2104, as well as one or more processing devices 2106 (e.g., one or more central processing units (CPUs), one or more graphical processing units (GPUs), and the like). Computing functionality 2100 also optionally comprises various media devices 2108, such as a hard disk module, an optical disk module, and so forth. Computing functionality 2100 may perform various operations identified above when the processing device(s) 2106 execute(s) instructions that are maintained by memory (e.g. RAM 2102, ROM 2104, and the like).

More generally, instructions and other information may be stored on any computer readable medium 2110, including, but not limited to, static memory storage devices, magnetic storage devices, and optical storage devices. The term "computer readable medium" also encompasses plural storage devices. In all cases, computer readable medium 2110 represents some form of physical and tangible entity. By way of example, and not limitation, computer readable medium 2110 may comprise "computer storage media" and "communications media."

"Computer storage media" comprises volatile and non-volatile, removable and non-removable media implemented in any method or technology for storage of information, such as computer readable instructions, data structures, program modules, or other data. Computer storage media may be, for example, and not limitation, RAM 2102, ROM 2104, EEPROM, Flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. Communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared, and other wireless media. Combinations of any of the above are also included within the scope of computer readable medium.

Computing functionality 2100 may also comprise an input/output module 2112 for receiving various inputs (via input modules 2114), and for providing various outputs (via one or more output modules). One particular output module mechanism may be a presentation module 2116 and an associated GUI 2118. Computing functionality 2100 may also include one or more network interfaces 2120 for exchanging data with other devices via one or more communication conduits 2122. In some embodiments, one or more communication buses 2124 communicatively couple the above-described components together.

Communication conduit(s) 2122 may be implemented in any manner (e.g., by a local area network, a wide area network (e.g., the Internet), and the like, or any combination thereof). Communication conduit(s) 2122 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The terms "module" and "component" as used herein generally represent software, firmware, hardware, or combinations thereof. In the case of a software implementation, the module or component represents program code that performs specified tasks when executed on a processor. The program code may be stored in one or more computer readable memory devices. The features of the present disclosure described herein are platform-independent, meaning that the techniques can be implemented on a variety of commercial computing platforms having a variety of processors (e.g., set-top box, desktop, laptop, notebook, tablet computer, personal digital assistant (PDA), mobile telephone, smart telephone, gaming console, and the like).

While various aspects of the present disclosure have been described herein, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures (e.g., utilizing additive manufacturing devices not mentioned herein, implementation within computing devices other than those disclosed herein, and operating in environments other than those disclosed herein). As will be appreciated by those skilled in the relevant art(s) after reading the description herein, certain features from different aspects of the systems, methods and computer program products of the present disclosure may be combined to form yet new aspects of the present disclosure.

What is claimed is:

1. A system operable in a microgravity environment, configured to cast objects using a mold, the system comprising:
   an additive manufacturing device to create the mold from a feedstock material layer by layer, the mold includes a casting cavity and a mold evacuation point;
   a casting formation unit comprising:
       an injector configured to inject a castable material into the mold, the castable material comprising a metal in filament form having a melting point lower than a melting point of the mold, and the injector comprises a multi-material extruder to extrude the feedstock and the metal that functions with the additive manufacturing device creating the mold to have at least one of the feedstock material as the mold, the metal as the mold and a combination of feedstock material and the metal as the mold, and is configured to melt the metal filament and inject the metal into the mold;
       a castable material source supplying the castable material to the injector; and
       a mold retaining device configured to hold the mold and position the mold in fluidic contact with the injector;
   a mold evacuator configured to connect to the mold at the mold evacuation point, evacuate atmosphere from the casting cavity and form a vacuum or partial vacuum within the casting cavity, wherein the mold evacuator pulls the castable material into the mold; and
   a sealable enclosure, comprising a door, to enclose the additive manufacturing device and the casting formation unit;
   wherein the enclosure is configured to prevent contamination of an outside environment by the castable material and the feedstock material used by the additive manufacturing device during operation;
   wherein the mold evacuator further comprises a plunger and a cylinder to evacuate the atmosphere from the mold to pull the castable material being injected into the mold.

2. The system of claim 1, wherein the metal is one of: tin, aluminum, gold, silver, copper, and a bismuth alloy.

3. The system of claim 1, further comprising an environmental control unit positioned within the enclosure and comprising at least one fan, a temperature regulation device having at least one of a heating device and an air conditioning unit and a filter.

4. The system of claim 1, further comprising the mold, the mold further comprising:
   an injection point configured to receive the castable material from the injector;
   at least one vent cavity connected to the casting cavity via at least one channel;
   wherein a vent cavity volume is chosen to contain air from the casting cavity during casting.

5. The system of claim 4, the at least one channel has a channel width, the channel width chosen to reduce entrance of molten castable material into the channel based on a molten castable material surface tension.

6. The system of claim 4, the mold further comprising at least one cooling channel and the system further comprising at least one cooling unit coupled to the at least one cooling channel, regulating a mold temperature of the mold during casting.

7. The system of claim 4, the mold further comprising:
   an insulating mold liner positioned on a casting cavity surface.

8. A system operable in a microgravity environment, configured to cast objects using a mold, the system comprising:
   an additive manufacturing device to create the mold and to receive a feedstock material, the mold includes a casting cavity and a mold evacuation point;
   a casting formation unit comprising:
   an injector configured to inject a castable material into the mold;
   a castable material source supplying the castable material to the injector;

a mold retaining device configured to hold the mold and position the mold in fluidic contact with the injector;

a mold evacuator configured to connect to the mold at the mold evacuation point, evacuate atmosphere from the casting cavity and form a vacuum or partial vacuum within the casting cavity, wherein the mold evacuator pulls the castable material into the mold and the mold evacuator comprises a plunger and a cylinder, with respect to a surface, configured to evacuate the atmosphere from the mold to pull the castable material being injected into the mold; and a sealable enclosure, comprising a door, to enclose the additive manufacturing device and the casting formation unit;

wherein the enclosure is configured to prevent contamination of an outside environment by the castable material and the feedstock material used by the additive manufacturing device during operation.

9. The system of claim 8, further comprising an environmental control unit positioned within the enclosure and comprising at least one fan, a temperature regulation device having at least one of a heating device and an air conditioning unit and a filter.

10. The system of claim 8, further comprising the mold wherein the mold further comprising:

an injection point configured to receive the castable material from the injector;

at least one vent cavity connected to the casting cavity via at least one channel;

wherein a vent cavity volume is chosen to contain air from the casting cavity during casting.

11. The system of claim 10, wherein the at least one channel has a channel width, the channel width chosen to reduce entrance of molten castable material into the channel based on a molten castable material surface tension.

12. The system of claim 10, wherein the mold further comprises at least one cooling channel and the system further comprises at least one cooling unit coupled to the at least one cooling channel, regulating a mold temperature of the mold during casting.

13. The system of claim 10, wherein the mold further comprises an insulating mold liner positioned on a casting cavity surface.

* * * * *